(12) United States Patent
Charbonnier

(10) Patent No.: US 9,211,771 B1
(45) Date of Patent: Dec. 15, 2015

(54) SYSTEM FOR TRANSPORT OF RESIDENTIAL WASTE CONTAINERS

(71) Applicant: Peter H Charbonnier, Essex, CT (US)

(72) Inventor: Peter H Charbonnier, Essex, CT (US)

( * ) Notice: Subject to any disclaimer, the term of this patent is extended or adjusted under 35 U.S.C. 154(b) by 0 days.

(21) Appl. No.: 14/497,790

(22) Filed: Sep. 26, 2014

(51) Int. Cl.
*B62B 1/06* (2006.01)
*B60D 1/18* (2006.01)
*B62B 5/00* (2006.01)
*B60D 1/56* (2006.01)

(52) U.S. Cl.
CPC ........ *B60D 1/187* (2013.01); *B60D 1/56* (2013.01); *B62B 5/0079* (2013.01)

(58) Field of Classification Search
CPC .................................................... B65F 1/147
USPC .......... 224/518, 519, 520, 521, 237; 280/480, 280/482, 483; 414/427, 462; 180/518, 519, 180/520, 521, 237
See application file for complete search history.

(56) References Cited

U.S. PATENT DOCUMENTS

| | | | | |
|---|---|---|---|---|
| 2,480,353 A | * | 8/1949 | Bjork | 224/323 |
| 2,789,743 A | * | 4/1957 | Waldman | 224/314 |
| 4,779,779 A | * | 10/1988 | Haugland | 224/328 |
| 6,033,178 A | * | 3/2000 | Cummins | 414/462 |
| 6,164,507 A | * | 12/2000 | Dean et al. | 224/324 |
| 2005/0023796 A1 | * | 2/2005 | Rasmussen | 280/400 |

* cited by examiner

*Primary Examiner* — Joseph Rocca
*Assistant Examiner* — Jacob Knutson
(74) *Attorney, Agent, or Firm* — Ira M. Turner

(57) ABSTRACT

In one embodiment, a container attachment system is provided. The system includes at least one strap coupled to a cross member at one end and terminating with an upper hook at the other end, the upper hook configured for hooking onto a vehicle; at least one anchor coupled to an opposite side of the cross member at one end and terminating with an lower hook at the other end, the lower hook configured for hooking onto the vehicle; wherein the cross member includes a retaining mechanism for attaching to a container. A method of fabrication is disclosed.

18 Claims, 2 Drawing Sheets

SYSTEM FOR TRANSPORT OF RESIDENTIAL WASTE CONTAINERS

BACKGROUND OF THE INVENTION

1. Field of the Invention

The invention disclosed herein relates to apparatus for transporting a residential waste container.

2. Description of the Related Art

The days where individuals simply "put out the trash" for collection by a service are quickly fading away. With the advent of mechanized waste and single stream recycling collection, many municipalities have required homeowners to maintain standardized waste containers that are designed for pickup with collection vehicles. In order to minimize the expense associate with maintaining waste containers and replacing broken waste containers, standardized waste containers are often chosen to be very big and sturdy. As a result, such waste containers are often large and heavy. In many instances, this is not a problem, in some it is.

Moving waste containers to the end of one's driveway is simple where the driveway is short and paved and the waste containers include wheels. One merely needs to roll the container a short distance to the curb and it is ready for pickup. However, not everyone lives so close to the curb. For example, many suburban residences are set back some distance from the road. Further, not everyone has a paved driveway. Accordingly, moving a large and heavy waste container to the end of the driveway may not be a simple task.

A homeowner may have a truck or a car that can pull a small trailer. In such instances, these tools may facilitate hauling of a waste container to the end of one's driveway. Again, however, not everyone has a truck or a trailer. Accordingly, hauling such a waste container to the end of the driveway may be a laborious task. This may be particularly onerous due to poor weather conditions, or when an individual is in a hurry or has health issues which impair their ability to drag a heavy wheeled container.

Thus, what are needed are methods and apparatus to assist homeowners with moving waste containers. Preferably, the methods and apparatus are simple to use and inexpensive to obtain.

SUMMARY OF THE INVENTION

In one embodiment, a container attachment system is provided. The system includes at least one strap coupled to a cross member at one end and terminating with an upper hook at the other end, the upper hook configured for hooking onto a vehicle; at least one anchor coupled to an opposite side of the cross member at one end and terminating with a lower hook at the other end, the lower hook configured for hooking onto the vehicle; wherein the cross member includes a retaining mechanism for attaching to a container.

In another embodiment, a method for fabricating a container attachment system is provided. The method includes selecting at least one strap configured for coupling to a cross member at one end and terminating with an upper hook at the other end, the upper hook configured for hooking onto a vehicle; at least one configured for coupling to an opposite side of the cross member at one end and terminating with an lower hook at the other end, the lower hook configured for hooking onto the vehicle; and the cross member, the cross member including a retaining mechanism for attaching to a container; and, assembling the at least one strap, the at least one anchor and the cross member.

In yet another embodiment, a container attachment system is provided. The system includes: upper means for securing a retaining means to a vehicle; lower means for securing the retaining means to a vehicle; and, retaining means for attaching to a container such that container attachment system may tow the container from the vehicle; wherein the upper means and the lower means provide for adjustably and temporarily being secured to the vehicle.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for transporting a residential waste container short distances. Generally, the system disclosed herein makes use of a personal use automobile to aid the user with the transporting. Apparatus include a container attachment system which is easily and temporarily affixed to a passenger motor vehicle. Advantageously, the container attachment system is relatively compact and may be easily stored. For example, the container attachment system may be rolled up and stored in the trunk of a car.

Figure 1:
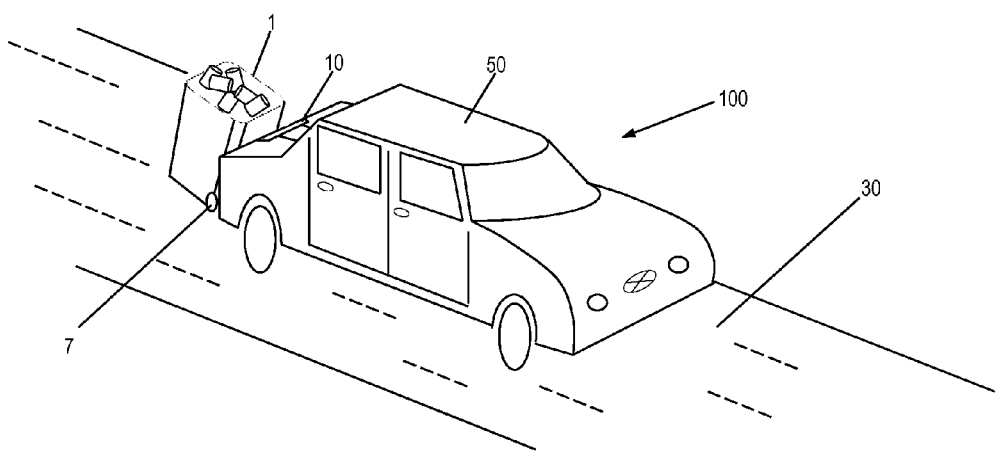
FIG. 1 is a perspective view of an automobile equipped with a container hauling system in accordance with the teachings herein.

Referring now to FIG. 1, aspects of a container transportation system 100 shown. In this example, the container transportation system 100 includes an automobile 50 and a container attachment system 10. In this example, the container attachment system 10 is mounted to the trunk of the automobile 50 which travels over road 30. In this illustration, the container attachment system 10 is configured with a container 1 used for retaining household refuse or waste. Accordingly, the container 1 may also be referred to as a "waste container" 1. Of course, the term "waste" is illustrative of use for the container 1, and is not limiting thereof. That is, the container 1 may be used to contain (and transport) any materials deemed appropriate by a user thereof.

Figure 2:
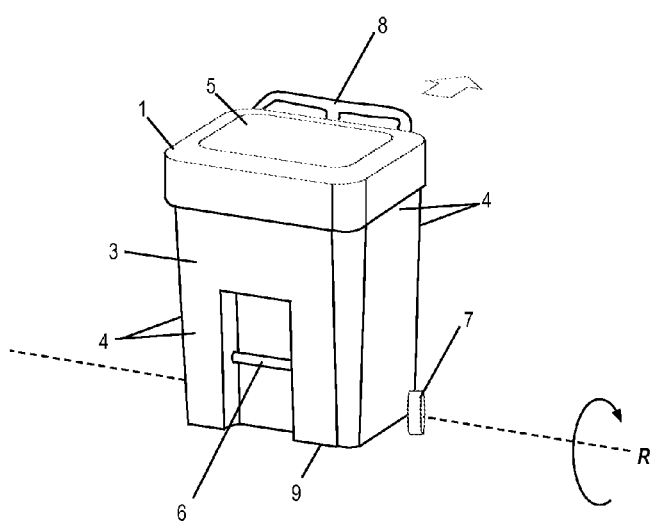
FIG. 2 is a perspective view of an exemplary container for use with the container hauling system.

Referring now to FIG. 2, aspects of an exemplary container 1 are shown. In this example, the container 1 is similar to many containers mandated for use by municipalities or private service providers. Generally, the container 1 includes a body 3. Disposed in a front of the waste container 1, within the body 3, is a cross bar 6. Generally, the cross bar 6 provides for retention and lifting of the container 1 with an appropriately equipped garbage truck. In this example, the container 1 further includes a lid 5.

The exemplary container 1 also includes a handle 8. Handle 8 is useful for manual manipulation of the container 1. For example, a user may pivot the container 1 about axis of rotation, R, by grasping the handle 8 and tilting the container 1 rearward (in the direction depicted by the directional arrow). Generally, tilting the container 1 in a rearward direction lifts the container 1 off of bottom floor 9, thus permitting free movement of the container 1 on wheels 7.

Exemplary containers suited for use with the container attachment system 10 include the families of curbside collection carts; two-wheel carts and caster carts, all of which are produced by TOTER of Statesville, N.C. The foregoing as well as a variety of other types of containers may be used with the system disclosed herein. In general, a "waste container" suited for use with the teachings herein includes any type of container that may be attached to the container attachment system 10 and subsequently transported by automobile 50.

In some embodiments, the container 1 includes a generic waste can outfitted with a hook suited for operation with the container attachment system 10.

Figure 3:
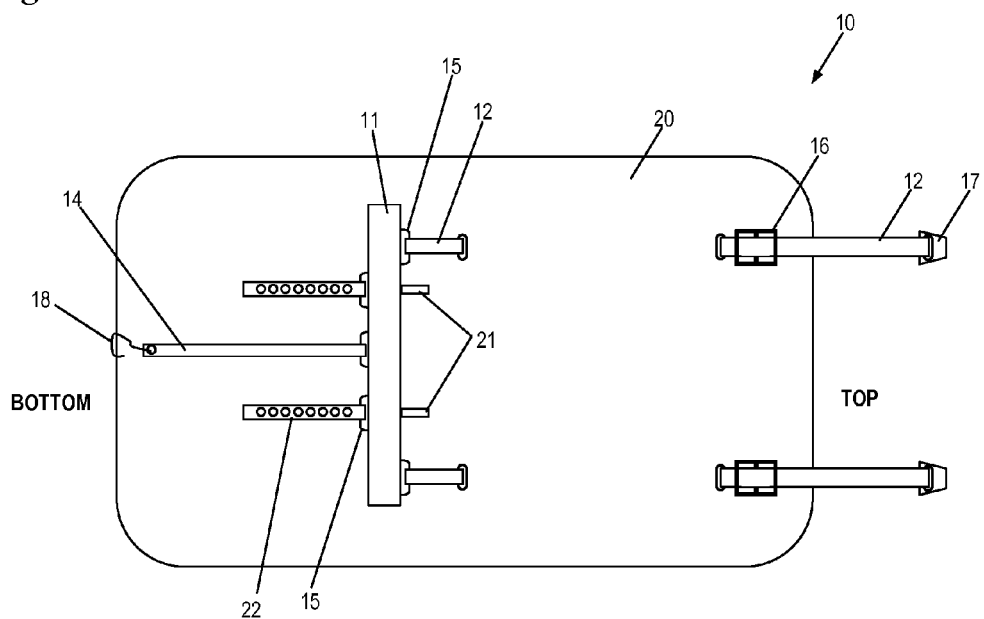
FIG. 3 is a top down view of an embodiment of apparatus for the container hauling system of FIG. 1.

Referring now to FIG. 3, an exemplary embodiment of the container attachment system 10 is shown. In the exemplary embodiment, the container attachment system 10 includes a backing 20. Merely for purposes of discussion, the container attachment system 10 is shown as having a top and a bottom. The top and bottom orientation is with respect to the container attachment system 10 when installed upon the automobile 50. This orientation is not to be construed as limiting of the invention in any way.

Generally, the backing provides for mounting of hardware, and separation of that hardware from the automobile 50. Accordingly, container attachment system 10 may be configured to protect or avoid degradation of a finish on the automobile 50. Exemplary forms of backing 20 include sheets of rubber, neoprene, felt, woven materials, nonwoven materials, and other such materials.

Woven through the backing 20 is at least one strap 12. The at least one strap 12 may be adjustable. The at least one strap 12 may be adjusted, for example, by manipulation of a respective slide 16, tri-glide, clamp, or other length adjusting device useful for adjusting a length of a strap. Generally, and merely for purposes of discussion, the length adjusting device is referred to as a "slide," although this is merely illustrative and is not limiting of the invention.

In some embodiments, the at least one strap 12 is stretchable. For example, the at least one strap may include, at least in part, a stretchable element such as a rubber cord (e.g., a bungee cord).

Disposed at a terminal end (referred to as an "upper end") of the at least one strap 12 is a respective upper hook 17. The hook upper 17 is generally configured to receive an end of the strap 12 and hook onto a feature of the automobile 50. For example, the upper hook 17 may be configured to hook onto a trunk lid or hatchback door. Exemplary embodiments of the strap 12 and the upper hook 17 include straps and hooks sometimes associated with trunk mounted bicycle racks.

An opposing terminal end (referred to as a "lower end") of the at least one strap 12 is woven through the backing 20 toward the middle to lower portion of the backing 20. The lower end of the at least one strap 12 is coupled to cross member 11. In an exemplary embodiment, the lower end of the at least one strap 12 is coupled a hoop 15 that is affixed to the cross member 11.

On a lower side of the cross member 11 (and therefore generally opposing the at least one strap 12) is at least one anchor 14. In an exemplary embodiment, the at least one anchor 14 includes a stretchable member such as a bungee cord. The at least one anchor 14 terminates with an appropriate device for anchoring the container attachment system 10 to an underside of the automobile 50. For example, where the at least one anchor 14 includes a stretchable member such as a bungee cord or a rubber cord, the at least one anchor 14 terminates with a lower hook 18. The lower hook 18 may be any form of the appropriate. Generally, the lower hook 18 is of an appearance differs from the upper hook 17. That is, in some embodiments, the upper hook 17 is configured to secure a respective strap 12 to the edge of a trunk lid. Accordingly, the upper hook 17 may be relatively flat an appearance with a shallow hook portion. In contrast, the lower hook 18 may be configured to be coupled to a trailer hitch, an inner edge of a bumper, a tow hook, a portion of the suspension of the automobile 50, or other portion of the automobile 50 that provides for secure the container attachment system 10.

The at least one anchor 14 may be adjusted, for example, by manipulation of a respective slide, tri-glide, clamp, or other length adjusting device useful for adjusting a length of a strap. Generally, and merely for purposes of discussion, the length adjusting device is referred to as a "slide," although this is merely illustrative and is not limiting of the invention.

In some embodiments, the at least one anchor 14 is stretchable. For example, the at least one strap may include, at least in part, a stretchable element such as a rubber cord (e.g., a bungee cord).

Also disposed on a lower side of the cross member 11 is at least one adjustable retaining strap 22. Generally, each one of the retaining straps 22 is coupled to the cross member 11 by a respective hoop 15. An opposing end of each one of the retaining straps 22 may be anchored upon a respective retainer 21.

In order to mount the container attachment system 10 onto the automobile 50, a user may simply set the upper hooks 17 along the forward edge of the trunk lid. The container attachment system 10 may be draped over the rear the automobile 50. The user may then simply anchor the at least one anchor 14 to the underside of the automobile 50. For example, the user may simply grasp a stretchable member such as a bungee cord and hook the stretchable member to an underside of the vehicle.

The user may adjust the slide 16 to ensure the cross member 11 is oriented at a desired height against the side (i.e., a rear side) of the automobile 50. Generally, once each slide 16 been appropriately adjusted, the user will not have to adjust the slide 16 again. Of course, the user may wish to adjust the slide 16 periodically to compensate for slippage, changes in vehicles, changes in waste containers and for other similar purposes.

Generally, the upper hooks 17 are designed to securely attached to an appropriate feature of the vehicle such that the container attachment system 10 is properly supported. Further, in some embodiments, the container attachment system 10 may be mounted to a hood (i.e., front of the car). Once the container attachment system 10 has been mounted onto the automobile 50, the container attachment system 10 is ready to receive the waste container 1.

In order to connect the container attachment system 10 with the container 1, the user will simply bring the automobile 50 and the container 1 together. Once the container 1 has been properly oriented, the user may simply thread each retaining strap 22 around the handle 8 and onto retainer 21.

Figure 4:
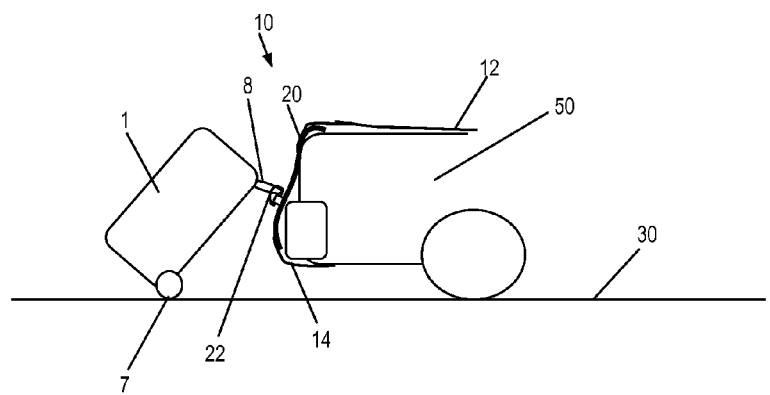
FIG. 4 is a schematic side view of an exemplary container attached to an automobile.

Referring now also to FIG. 4, there is shown a schematic side view of the container attachment system 10 mounted to a rear of the automobile 50. As shown in this illustration, the container 1 is tilted in a rearward direction (toward a front of the automobile 50), such that the container 1 may be towed by the container attachment system 10. As shown, the handle 8 of the container 1 is securely retained by the at least one retaining strap 22.

Having thus introduced exemplary embodiments of the container attachment system 10, some additional aspects and embodiments are now presented.

In some embodiments, the container attachment system 10 is provided without the backing 20.

In some embodiments, the container attachment system 10 includes metal or metallic components. For example, the cross member 11, each hoop 15, each retainer 21 the lower hook 18 and the upper hook 17 are fabricated from metal or metallic materials. In some other embodiments, at least some of the foregoing components are fabricated from synthetic materials such as various forms of plastics and polymers. Exemplary materials include polyvinyl chloride (PVC), acrylonitrile butadiene styrene (ABS), aliphatic polyamides (such as NYLON available from DuPont Corporation of Wilmington Del.) and other similar materials.

Some embodiments, the at least one strap 12 is formed of a woven material such as woven or braided NYLON, cotton, hemp, or other such materials. The at least one strap 12 may be a single strap, such as, for example, a single wide strap. In some other embodiments, the at least one strap 12 may include a plurality of straps. For example, in some embodiments, the container attachment system 10 may be configured to simultaneously carry multiple waste containers 1, and an appropriate number (such as four or more) may be used.

Generally, the container attachment system 10 may be used with any vehicle capable of performing the described functions. That is, it is not a requirement that the container attachment system 10 be disposed on the automobile 50. For example, the container attachment system 10 may be disposed onto a truck.

A variety of devices may be used for attaching to and retaining the cross bar 6. For example, a variety of mounting systems are known for bicycle racks. Such mounting systems may be adapted for use with the container attachment system 10.

In some embodiments, a prior art waste container may be configured with an appropriate type of handle 8 in order to accommodate use of the container attachment system 10. In some of these embodiments, the container attachment system 10 may be reconfigured such that the container attachment system 10 is capable of hoisting and transporting the prior art container by use of a hook or other similar feature in place of the handle 8.

In some embodiments, the container attachment system 10 is configured for mounting to a side of the automobile 50. For example, the container attachment system 10 may be mounted to a door, such as a door for entering a backseat. The container attachment system 10 may include an arm that extends perpendicular to a side of the automobile 50, and includes appropriate hardware for retaining the container 1.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A container attachment system, the system comprising:
   at least one strap coupled to a cross member at one end and terminating with an upper hook at another end, the upper hook configured for hooking onto an upper portion of a vehicle;
   at least one anchor coupled to an opposite side of the cross member at one end and terminating with an lower hook at another end, the lower hook configured for hooking onto an underside of the vehicle;
   wherein the cross member is mounted upon a protective backing and comprises a retaining mechanism for attaching to a container and the at least one strap is woven through the protective backing.

2. The container attachment system as in claim 1, wherein the backing comprises at least one of a sheet of rubber, neoprene, felt, woven material, and nonwoven material.

3. The container attachment system as in claim 1, wherein the at least one strap is adjustable.

4. The container attachment system as in claim 3, wherein the at least one strap comprises at least one of a slide, a tri-glide, a clamp and a stretchable element.

5. The container attachment system as in claim 1, wherein the upper hook is configured to mount to a trunk lid of the vehicle.

6. The container attachment system as in claim 1, wherein the at least one anchor is adjustable.

7. The container attachment system as in claim 6, wherein the at least one anchor comprises at least one of a slide, a tri-glide, a clamp and a stretchable element.

8. The container attachment system as in claim 1, wherein the lower hook is configured to mount to one of a trailer hitch, an inner edge of a bumper, a tow hook and a portion of a suspension of the vehicle.

9. The container attachment system as in claim 1, wherein the retaining mechanism comprises at least one retaining strap.

10. The container attachment system as in claim 1, wherein the retaining mechanism is configured to secure a handle of the container.

11. The container attachment system as in claim 1, wherein when mounted upon the vehicle, the system is configured to tow the container.

12. The container attachment system as in claim 1, wherein the protective backing provides for separation of the container attachment system from a finish on the automobile.

13. A method for fabricating a container attachment system, the method comprising:
   selecting at least one strap configured for coupling to a cross member at one end and terminating with an upper hook at another end, the at least one strap is woven through the protective backing; the upper hook configured for hooking onto a vehicle; at least one another configured for coupling to an opposite side of the cross member at one end and terminating with an lower hook at another end, the lower hook configured for hooking onto the vehicle; and the cross member is mounted upon a protective backing and comprises a retaining mechanism for attaching to a container; and,
   assembling the at least one strap, the at least one anchor and the cross member.

14. A container attachment system, the system comprising:
upper means for securing a retaining means to an upper portion of a vehicle;
lower means for securing the retaining means to an underside of the vehicle; and,
another retaining means for attaching to a container such that the container attachment system may tow the container from the vehicle;
wherein the upper means and the lower means provide for adjustably and temporarily being secured to the vehicle and at least one of the upper means and the lower means is woven through a protective means configured to protect a finish of the vehicle.

15. The container attachment system as in claim 14, wherein the vehicle comprises an automobile.

16. The container attachment system as in claim 15, wherein the upper means is configured for mounting to a trunk lid and the lower means is configured for mounting to a rear bumper of the automobile.

17. The container attachment system as in claim 14, wherein the another retaining means is configured to attach to a handle of the container.

18. The container attachment system as in claim 14, wherein the protective means is configured for providing separation of the retaining means from a finish on the automobile.

* * * * *